(12) United States Patent
Ikenishi

(10) Patent No.: US 8,713,970 B2
(45) Date of Patent: May 6, 2014

(54) METHOD FOR PRODUCING FLUOROPHOSPHATE GLASS, GLASS MATERIAL FOR PRESS MOLDING AND OPTICAL ELEMENT

(75) Inventor: Mikio Ikenishi, Akishina (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/272,692

(22) Filed: Oct. 13, 2011

(65) Prior Publication Data

US 2012/0090358 A1    Apr. 19, 2012

(30) Foreign Application Priority Data

Oct. 14, 2010    (JP) .................................. 2010-231058

(51) Int. Cl.
*C03C 3/247*    (2006.01)

(52) U.S. Cl.
USPC .......................................... 65/134.1; 65/305

(58) Field of Classification Search
USPC .................................... 501/44; 65/305, 134.1
See application file for complete search history.

(56) References Cited

U.S. PATENT DOCUMENTS

| | | | |
|---|---|---|---|
| 7,192,897 B2 * | 3/2007 | Yamane et al. ................. | 501/44 |
| 2004/0082460 A1 * | 4/2004 | Yamane et al. ................. | 501/48 |
| 2004/0087428 A1 * | 5/2004 | Otsuka et al. .................. | 501/48 |
| 2006/0223689 A1 * | 10/2006 | Ikenishi et al. ................. | 501/45 |
| 2007/0060464 A1 * | 3/2007 | Ikenishi et al. ................. | 501/48 |
| 2007/0096067 A1 * | 5/2007 | Zou et al. ....................... | 252/587 |
| 2008/0132400 A1 * | 6/2008 | Hachitani ....................... | 501/44 |
| 2009/0082190 A1 * | 3/2009 | Ogino ............................. | 501/78 |
| 2009/0247387 A1 * | 10/2009 | Ikenishi .......................... | 501/44 |
| 2009/0247388 A1 * | 10/2009 | Ikenishi .......................... | 501/44 |
| 2009/0298668 A1 * | 12/2009 | Ikenishi .......................... | 501/44 |
| 2010/0113247 A1 * | 5/2010 | Ikenishi .......................... | 501/44 |
| 2012/0035043 A1 * | 2/2012 | Suzuki ............................ | 501/47 |
| 2012/0090358 A1 * | 4/2012 | Ikenishi .......................... | 65/102 |
| 2012/0165178 A1 * | 6/2012 | Ritter et al. .................... | 501/44 |
| 2012/0241697 A1 * | 9/2012 | Ohkawa et al. ............... | 252/587 |

FOREIGN PATENT DOCUMENTS

| | | |
|---|---|---|
| JP | 2009-286670 | 12/2009 |
| JP | 2010-059023 | 3/2010 |

OTHER PUBLICATIONS

U.S. Appl. No. 13/278,875 to Mikio Ikenishi, filed Oct. 21, 2011.

* cited by examiner

*Primary Examiner* — Jodi C Franklin

(74) *Attorney, Agent, or Firm* — Greenblum & Bernstein, P.L.C.

(57) ABSTRACT

In order to produce a fluorophosphate glass including $P^{5+}$ at a small content on the composition thereof, the composition is adjusted so as to provide well-balanced chemical durability and thermal stability. In the production of a fluorophosphate glass in which $O^{2-}/P^{5+}>3.7$, $Al^{3+}$ content is in a predetermined amount or more and $p^{5+}$ content is in a predetermined amount or less, a glass raw material is prepared by using an $AlF_3$ in which the content of $Al_2O_3$ is limited to the range from 1 to 5% by mass, and the raw material is melted to produce the fluorophosphate glass.

4 Claims, No Drawings

METHOD FOR PRODUCING FLUOROPHOSPHATE GLASS, GLASS MATERIAL FOR PRESS MOLDING AND OPTICAL ELEMENT

TECHNICAL FIELD

The present invention relates to methods for producing a fluorophosphate glass, a glass material for press molding and an optical element.

BACKGROUND ART

Since a fluorophosphate glass has low dispersibility and abnormal partial dispersibility, it is a glass effective for a high-level correction of chromatic aberration, it is frequently used as a material for a lens that is positioned most closely to the side of a photographic subject, which is called a front lens, in a telephoto lens, or the like. A fluorophosphate glass has a problem that it shows significant volatility and corrosive property in the production steps thereof, and the present inventors have disclosed inventions for solving the above-mentioned problem in Patent Documents 1 and 2, by adjusting the molar ratio ($O^{2-}/P^{5+}$) of the amount of $O^{2-}$ and the amount of $P^{5+}$ in a glass to 3.5 or more.

Furthermore, a fluorophosphate glass has the following problem even after the production of the glass. A lens made of a fluorophosphate glass is made, for example, by grinding and polishing a glass that has been processed into a lens shape; however, during the polishing, a deteriorated layer called grinding burn is easily formed on the surface of the glass. This is a problem attributed to the chemical durability of the fluorophosphate glass.

PRIOR ART DOCUMENTS

Patent Documents

[Patent Document 1] JP-A-2009-286670
[Patent Document 2] JP-A-2010-059023

DISCLOSURE OF THE INVENTION

Problem to be Solved by the Invention

In order to improve the chemical durability of a fluorophosphate glass, the present inventors have found that the chemical durability can be improved by increasing the molar ratio of the amount of $O^{2-}$ and the amount of $P^{5+}$ in the glass, $O^{2-}/P^{5+}$, to 3.7 or more.

However, when $O^{2-}/P^{5+}$ is raised to 3.7 or more, thermal stability (devitrification durability) is deteriorated significantly.

However, in the case when the content of $P^{5+}$ in the composition was 15 cation % or less, the molar ratio $O^{2-}/P^{5+}$ was varied significantly due to the variation in the content of $O^{2-}$ in the glass, and thus it was difficult to stably produce a fluorophosphate glass possessing good chemical durability and thermal stability in a balanced manner.

The present inventors have searched the cause thereof, and revealed followings. Since a glass including $P^{5+}$ at a small content and fluorine in an anion at a high ratio is introduced $Al^{3+}$ having a function for maintaining thermal stability and a large amount of fluorine simultaneously into the glass, a large amount of $AlF_3$ is used as a raw material component for $Al^{3+}$. $AlF_3$ includes a considerable amount of $Al_2O_3$ as an impurity depending upon the production method thereof. When the content of $Al_2O_3$ is varied, $O^{2-}/P^{5+}$ in the composition is accordingly varied; therefore, the component composition deviates from a composition that possesses well-balanced properties between chemical durability and thermal stability, consequently the thermal stability is deteriorated and the producibility is decreased.

Therefore, the objects of the present invention are to provide a method for stably producing a fluorophosphate glass having a composition that exhibits well-balanced properties between chemical durability and thermal stability in order to produce a fluorophosphate glass including $P^{5+}$ at a small content in the composition, and to provide methods for producing a glass material for press molding and an optical element by using the glass prepared by the above-mentioned method.

Means for Solving the Problem

In order to solve the above-mentioned problem, it is necessary to keep the content of $Al_2O_3$ in $AlF_3$ constant; however, since $Al_2O_3$ is an unreacted substance in the production of $AlF_3$, the content of $Al_2O_3$ varies significantly in $AlF_3$ that is obtained by a production method in which $Al_2O_3$ is included at a large amount.

Therefore, in the present invention, variation in the amount of $Al_2O_3$ introduced in the glass is suppressed by using $AlF_3$ including $Al_2O_3$ at a small content.

Since it is important that the variation in the content of $Al_2O_3$ is small in the method of the present invention, it is not necessary to use an ultrapure $AlF_3$, and the amount of $Al_2O_3$ in $AlF_3$ may be from 1 to 5% by mass.

The fluorophosphate glass as the object of the present invention generally includes $Al^{3+}$ at 15% or more by cation % and $P^{5+}$ at 15% or less by cation %.

In order to adjust the amount of $Al_2O_3$ to less than 1% by mass, the purity of $AlF_3$ should be increased and thus the raw material cost increases. Whereas if the amount of $Al_2O_3$ exceeds 5% by mass, and when the above-mentioned predetermined amount of Al is introduced, $O^{2-}$ tends to be excessive, it is highly possible that the thermal stability of the glass is decreased, and it becomes thus difficult to stably produce a high quality glass, i.e., an optical glass.

In order to improve the decrease in the production stability of the glass caused by $AlF_3$ that is introduced as a raw material component so as to improve thermal stability when the molar ratio $O^{2-}/P^{5+}$ is adjusted to 3.7 or more for improving the chemical durability of the fluorophosphate glass, in a method for producing a fluorophosphate glass comprising preparing a glass raw material and melting the raw material to produce the fluorophosphate glass, the present invention provides a method for producing a fluorophosphate glass comprising preparing the glass raw material including an $AlF_3$ in which the content of $Al_2O_3$ is limited to the range from 1 to 5% by mass, and melting the raw material to produce the fluorophosphate glass in which the molar ratio of the content of $O^{2-}$ to the content of $P^{5+}$, $O^{2-}/P^{5+}$, is 3.7 or more, the content of $Al^{3+}$ is 15 cation % or more, and the content of $P^{5+}$ is 15 cation % or less.

Meanwhile, from the viewpoint of maintaining the thermal stability of the glass, it is desirable that the molar ratio of the content of $O^{2-}$ to the content of $P^{5+}$, $O^{2-}/P^{5+}$, is adjusted to 4.2 or less.

Furthermore, the present invention provides: a method for producing a glass material for press molding, which includes producing a glass by the method, and processing the glass to prepare the glass material for press molding; a method for producing an optical element, including the steps of heating, softening and press-molding a glass material for press molding produced by the method; and a method for producing an optical element, including producing a glass by the method, and processing the glass.

Since the fluorophosphate glass produced by the method of the present invention is excellent in not only chemical durability but also thermal stability, a glass material for press molding can be produced by using this glass, and a high quality optical element can be produced by heating, softening and press-molding this material.

Alternatively, an optical element free from grinding burn can also be produced by directly polish-processing the above-mentioned glass.

Effect of the Invention

According to the method of the present invention, a fluorophosphate glass that is excellent in not only the chemical durability but also the thermal stability of the fluorophosphate glass can be produced stably by keeping the content of $Al_2O_3$ including in $AlF_3$ as a raw material component within a certain range in the production of the fluorophosphate glass. Furthermore, since it is not necessary to use an ultrapure $AlF_3$, a fluorophosphate glass can be provided at a low cost by a synergistic effect with the productivity improvement of the glass.

Moreover, by using the glass prepared by the above-mentioned method, a glass material for press molding and an optical element can be produced stably. In addition, an optical element having excellent resistance against grinding burn can be provided stably.

EMBODIMENT FOR CARRYING OUT THE INVENTION

Examples

The present invention will be explained in more detail with referring to the Examples.

Example 1

In the production of the fluorophosphate glass having a glass composition in which the cation components and anion components were included in the percentages as shown in Table 1-1 (the glass composition obtained by converting the glass components to oxides and fluorides is shown in Table 1-2), phosphates, fluorides, oxides and the like corresponding to respective glass components were used as raw material components for introducing the respective components; the raw material components were weighed and mixed sufficiently to give a prepared raw material, and this was put into a platinum crucible, heated and melted. The obtained molten glass was fined, homogenized, poured into a casting mold, left to cool to around the glass transition temperature, and immediately put into an annealing furnace, annealed at around the glass transition temperature for 1 hour, and left to cool to room temperature in the furnace, thereby obtaining a optical glass block.

Meanwhile, fluorides were used as raw material components for introducing $Al^{3+}$, $Mg^{2+}$, $Ca^{2+}$ and $Sr^{2+}$, a fluoride and a Ba salt were used in combination as raw material components for introducing $Ba^{2+}$, and phosphates, oxides, alkali salts and the like were used for introducing other components. As the raw material components other than the $AlF_3$, raw material components that are used in the production of a general optical glass were used; for the $AlF_3$ as a raw material component, an $AlF_3$ raw material component in which $Al_2O_3$, which is included as an impurity, had been decreased up to 3% by mass, i.e., a highly pure $AlF_3$ raw material component including $AlF_3$ at a purity of 97% by mass was used.

TABLE 1-1

| Glass composition | |
|---|---|
| Cation components (cation %) | |
| $P^{5+}$ | 6 |
| $Al^{3+}$ | 33 |
| $Mg^{2+}$ | 5 |
| $Ca^{2+}$ | 28 |
| $Sr^{2+}$ | 17 |
| $Ba^{2+}$ | 5 |
| $Li^+$ | 2 |
| $Na^+$ | 1 |
| $Y^{3+}$ | 1 |
| Total | 100 |
| Anion components (anion %) | |
| $F^-$ | 89 |
| $O^{2-}$ | 11 |
| Total | 100 |
| Molar ratio $O^{2-}/P^{5+}$ | 3.9125 |
| Glass condition | Fine (Optical glass) |
| Refractive, index (nd) | 1.43 |
| Abbe's number (vd) | 95 |
| Glass transition temperature (° C.) | 440 |

TABLE 1-2

| Glass composition (mass %) | |
|---|---|
| $P_2O_5$ | 4.79 |
| $Al_2O_3$ | 0.95 |
| $AlF_3$ | 29.62 |
| $MgF_2$ | 4.91 |
| $CaF_2$ | 24.60 |
| $SrF_2$ | 24.04 |
| BaO | 5.18 |
| $BaF_2$ | 3.95 |
| $Li_2O$ | 0.34 |
| $N_2O$ | 0.35 |
| $Y_2O_3$ | 1.27 |
| Total | 100 |

The obtained glass was observed, precipitation of crystals was not observed, and thus the glass has a high homogeneity as an optical glass. The refractive index, Abbe's number and glass transition temperature of the above-mentioned glass are shown in Table 1-1.

Since the above-mentioned fluorophosphate glass does not include additives that produce fluorescence such as Tb and Eu, it does not produce fluorescence even ultraviolet light enters, and fluorescence is not photographed even when the glass is used as an imaging lens. Furthermore, since a colorant such as Cu and Cr is not included, a lens having fine color reproduction property can also be made.

Next, the above-mentioned glass block was cut and divided into a plurality of glass pieces. These glass pieces were barrel polished to round the edges of the glass pieces, and the mass of each glass piece was adjusted so as to be equal to the mass of one lens blank, thereby obtaining a glass material for press molding.

Furthermore, a boron nitride powder was uniformly applied to the surface of the glass material for press molding, and the glass material was heated, softened, and introduced in a mold for press molding and press-molded to give a lens' blank.

The obtained lens blank was annealed to decrease distortion and fine-tune the refractive index, and the lens blank was then grinded and polished by known methods to make a lens.

The obtained lens was not observed deterioration such as grinding burn on the surface thereof. In addition, the surface of the lens may be coated with an antireflective film, if necessary.

Although the optical glass was obtained by putting the raw material (batch raw material) obtained by preparing various compounds such as $AlF_3$ and the like into a crucible and melting, the optical glass can also be obtained by roughly melting the batch raw material to make a cullet, putting the cullet into a crucible and melting.

Example 2

A glass was melted in a similar manner to Example 1, the molten glass was poured from a pipe and the tip of the molten glass flow was received on the molding surface of a female mold of a mold for press molding, and the molten glass flow was sheared by a cutting blade called a shear blade to give a molten glass lump corresponding to one lens blank on the molding surface of the female mold.

The female mold with the molten glass lump mounted thereon was then transferred to the position above which a male mold was waiting, and the glass lump was press-molded by the male mold and female mold to give a lens blank.

The obtained lens blank was annealed to decrease distortion and fine-tune the refractive index, and then the lens blank was grinded and polished by known methods to prepare a lens.

The obtained lens was not observed deterioration such as grinding burn on the surface thereof. In addition, the surface of the lens may be coated with an antireflective film, if necessary.

Example 3

The glass block obtained in Example 1 was cut, grinded and polished by known methods to give a lens. The obtained lens was not observed deterioration such as grinding burn on the surface thereof. In addition, the surface of the lens may be coated with an antireflective film, if necessary.

Since all lenses made in Examples 1 to 3 have low dispersibility and abnormal partial dispersibility, they are glass lenses effective for a high-level correction of chromatic aberration, and are preferable for a front lens in a telephoto lens.

Comparative Example

A fluorophosphate glass was prepared in a similar manner to that of Example 1, except that an $AlF_3$ raw material component that is generally used for the production of a common glass was used. When the purity of the above-mentioned $AlF_3$ raw material component was examined, it was found that the purity of $AlF_3$ was 93% by mass and that the $AlF_3$ raw material component included 6% by mass of $Al_2O_3$ as an impurity. It was attempted to obtain a glass having the composition shown in Table 1-1, but the actual composition was that shown in Table 2-1 and Table 2-2. The format for representing the composition in Table 2-1 is similar to that of Table 1-1, and the format for representing the composition in Table 2-2 is similar to that of Table 1-2. The above-mentioned raw material was heated and melted in a crucible to give a molten product, and the molten product was then poured into a casting mold, cooled rapidly and solidified; when the solidified product was observed, precipitation of crystals was observed, and thus the method was unstable as a process for producing an optical glass.

TABLE 2-1

Glass composition

| Cation components (cation %) | |
| --- | --- |
| $P^{5+}$ | 6 |
| $Al^{3+}$ | 33 |
| $Mg^{2+}$ | 5 |
| $Ca^{2+}$ | 28 |
| $Sr^{2+}$ | 17 |
| $Ba^{2+}$ | 5 |
| $Li^+$ | 2 |
| $Na^+$ | 1 |
| $Y^{3+}$ | 1 |
| Total | 100 |
| Anion components (anion %) | |
| $F^-$ | 88 |
| $O^{2-}$ | 12 |
| Total | 100 |
| Molar ratio $O^{2-}/P^{5+}$ | 4.4075 |

TABLE 2-2

Glass composition (mass %)

| | |
| --- | --- |
| $P_2O_5$ | 4.83 |
| $Al_2O_3$ | 2.10 |
| $AlF_3$ | 27.97 |
| $MgF_2$ | 4.95 |
| $CaF_2$ | 24.78 |
| $SrF_2$ | 24.21 |
| BaO | 5.21 |
| $BaF_2$ | 3.98 |
| $Li_2O$ | 0.34 |
| $N_2O$ | 0.35 |
| $Y_2O_3$ | 1.28 |
| Total | 100 |

The invention claimed is:

1. A method for producing a fluorophosphate glass, by preparing a glass raw material and melting the raw material, comprising preparing the glass raw material including an $AlF_3$ in which the content of $Al_2O_3$ is limited to the range from 1 to 5% by mass, and melting the raw material to produce the fluorophosphate glass in which the molar ratio of the content of $O^{2-}$ to the content of $P^{5+}$, $O^{2-}/P^{5+}$, is 3.7 or more, the content of $Al^{3+}$ is 15 cation % or more and the content of $P^{5+}$ is 15 cation % or less.

2. A method for producing a glass material for press molding, comprising producing a glass by the method according to claim 1, and cutting or dividing the glass into a plurality of glass pieces to produce the glass material for press molding.

3. A method for producing an optical element, comprising the steps of heating, softening and press-molding a glass material for press molding produced by the method according to claim 2.

4. A method for producing an optical element, comprising producing a glass by the method according to claim 1, and polishing the glass.

* * * * *